Aug. 28, 1928. 1,682,173
S. A. GAEDE
WINDOW MOUNTED AUTOMOBILE SIGNAL
Filed Feb. 29, 1928
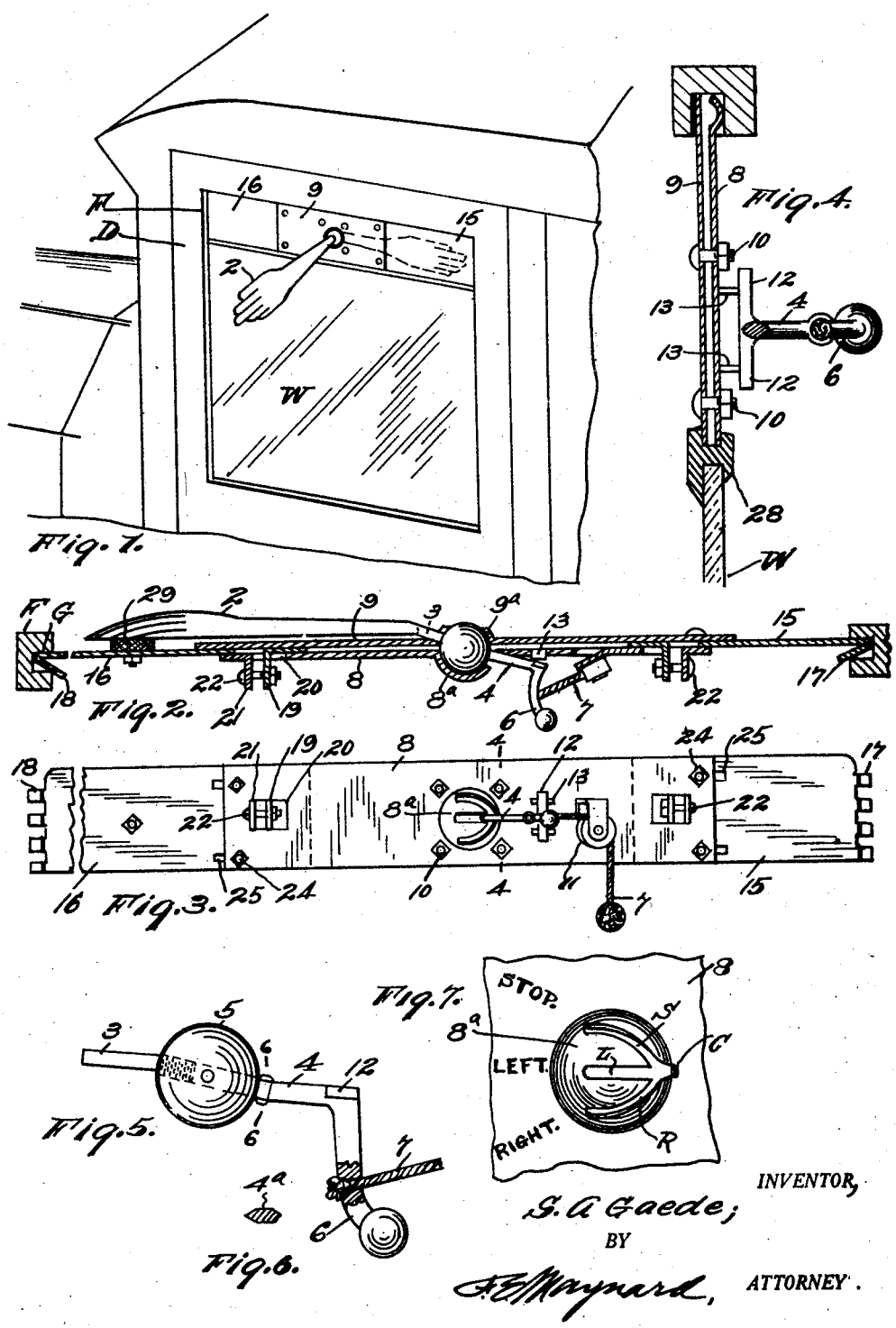
INVENTOR,
S. A. Gaede;
BY
F. E. Maynard, ATTORNEY.

Patented Aug. 28, 1928.

1,682,173

UNITED STATES PATENT OFFICE.

SAMUEL A. GAEDE, OF LOS ANGELES, CALIFORNIA.

WINDOW-MOUNTED AUTOMOBILE SIGNAL.

Application filed February 29, 1928. Serial No. 257,961.

This invention relates to automobile traffic signals and especially to a vehicle-mounted semaphore.

Certain arm signals are now almost universally recognized as indicative of left and right turns and stop and an object of this invention is to provide a simple device capable of simulating the usual arm signals.

Another object is to provide a signal arm device which may be easily and safely adjusted into place in the upper part of an automobile door having a sliding glass window, so that the device is in an out of the way place, is readily accessible by the driver and locates the effective arm in about the normal arm signal position.

An object is to provide an arm signal device which may be installed without in any manner altering the car parts and to provide a weather proof adaptation of the device to the car door.

A further object is to provide a signal device having a signal arm exterior to the vehicle and operative means therefor within the vehicle.

Numerous other objects, advantages and features of construction and details of means will be made manifest in the ensuing description of the herewith illustrative embodiment; it being understood that modifications, variations and adaptations may be resorted to within the scope, spirit and principle of the invention as it is more directly claimed hereinafter.

Figure 1 is a perspective of the applied signal in "left" turn position.

Figure 2 is a longitudinal section of the device in extended applied position; showing the semaphore arm retracted.

Figure 3 is an inside face elevation of the dismounted device.

Figure 4 is a vertical section on line 4—4, Fig. 3.

Figure 5 is detail plan of the finger lever and its ball bearing.

Figure 6 is a cross-section of the lever on line 6—6, Fig. 5.

Figure 7 is a detail face view of the ball socket and cam guides for the finger lever.

The present signal device is especially adapted to be installed in the window frame F of an automobile door D on the driver's side of the car; such door usually having a sliding glass window W operating in grooves G in the frame F.

The device is organized in a bodily portable unit which is placed in the door frame F above the glass W and this can then be run up close to the signal so as to make a weather tight closure at the top of the window which can be lowered at any time wholly independent of the mounted signal. This location of the signal means makes it very convenient for the driver in giving the requisite signal notice and yet the device forms no material obstruction to the view.

The unit includes a semaphore 2 simulating a hand and forearm and its wrist part is secured to the stem 3, Fig. 5, of a lever 4 which passes through a ball 5 and has on its inner end a finger hook 6 provided with a pull cord 7.

The ball is frictionally clamped in a socket formed by inner and outer plates 8 and 9 the pressure of which on the ball is regulated by adjustment of draw bolts 10 passing from plate to plate and disposed in a group around the ball socket. This socket includes a bearing boss $9^a$ on the outer face of plate 9 and a hemispherical embossment $8^a$ on the inner face of the plate 8.

Means are provided to guide the stem 4, which projects through the ball seat $8^a$ for manual operation, in a manner to position the outer signal hand 2 in any of three selective positions.

This means includes guideways S—L—R formed in the ball seat $8^a$ and converging toward one side where there is a crotch C, Fig. 7, into which the lever 4 is pulled by the cord 7 to bring the hand flat back to inoperative position, along the side of the unit.

The guideways S and R are duplicate in form but of opposite curves to the top and bottom of the seat and the guideway L is straight across the seat. In order to properly track the lever 4 this has its neck $4^a$, at the ball, sharply bevelled at its front and rear edges, as shown in Fig. 6.

The plate 8 is indexed with words "Stop"—"Left"—"Right" on lines with respective guideways S—L—R. When the driver intends to turn or stop he simply applies a finger of the left hand to the retracted hook 6 and sharply pulls it up or down, or straight back into the selective guiding track desired. The sharp neck of the lever 4 readily slips into the selected guideway and thereafter the flat sides of the neck hug the guideway to its end the signal hand 2 is thrown, non-turnably, into the effective position, as in Fig. 1; the ball being held in place by the friction of its socket.

The pull cord leads back to a guide pulley 11, on plate 8, and when the hand 2 is to be retracted a pull on the cord swings the lever 4 back and brings horns 12 thereon hard up against a pair of rigid stop lugs 13 which are disposed one above the other at opposite sides of the center line of the crotch C so as to automatically turn the neck 4ª into a neutral or "ready" position for the next action.

The socket plates 8—9 and the signal hand 2 may be installed in various suitable locations, and in the present case the mounting means is designed for application to the glass guide grooves G in the door frame F and in place over the glass window. The mounting means includes separately adjustable jamb wings 15 and 16 whose outer ends are hooked to present wedges 17—18 to jamb snugly into the grooves G.

The wings are slidable between the plates 8—9 and have lugs 19 projecting inwardly through slots 20 therefor in the plates, which latter have coordinate lugs 21 in which are provided pull bolts 22 operative, through the lugs 19, to positively thrust the wings 15 outward against the walls of the grooves, whereby to rigidly sustain the installed unit. To insure safety of adjustment the wings are solidly clamped in set position by means of bolts 24 in the plates 8—9 and which pass through slots 25 in the inner ends of the adjustable wings 15—16.

It will be seen that the wings allow for adjustment of the signal unit to frames of various widths of windows. By providing stocks of wings of different lengths a great range of length variations is obtained.

When the unit is installed its top edge is set tightly up in the frame F and there is interposed between the bottom edge of the unit and the top edge of the glass W a rubber weather strip 28.

When the signal hand is sharply pulled back to ineffective position, Fig. 2, it is cushioned against a buffer 29.

One form of construction ball and lever 4 is clearly shown in Fig. 5.

What is claimed is:

1. A manual automobile signal device including a ball and socket mechanism and a mount therefor, a signal hand secured to one side of the ball and an operating lever secured to the opposite side of the ball, and guideways for the lever whereby the said hand is guided to one of a series of selective effective signalling positions.

2. A manual automobile signal device including a signal hand, a ball to which it is connected, an operating lever connected to the ball for turning it, and a ball socket having guideways, for the lever, to carry the hand to different signal angles.

3. A manual automobile signal device including a ball having a projecting hand member and an oppositely projecting operating lever, and a bearing socket for the ball having a series of converging lever guideways.

4. A manual automobile signal device including a ball having a projecting hand member and an oppositely projecting operating lever, and a bearing socket for the ball having a series of converging lever guideways leading to a crotch, and abutment means for rocking the lever to a neutral position in the crotch.

5. A manual automobile signal device including a ball having a projecting hand member and an oppositely projecting operating lever, and a bearing socket for the ball having a series of converging lever guideways in its outer side, and means for regulating friction on the ball in its socket.

6. In an arm semaphore device, a mount, a signal arm having a bearing ball and a finger lever projecting therefrom, and a ball seat provided with cam means for selectively guiding the arm to various effective outstanding angular signal positions from a retracted position flat against the mount.

7. An automobile arm signal unit including a ball, a socket device frictionally clamping the ball, a signal hand secured to the outer side of the ball and a finger lever secured to its opposite side, diverging guideways for the lever to lead it to different signal positions, and mounting wedges for jambing the unit in position in a supporting structure.

8. An automobile arm signal unit including a ball, a socket device frictionally clamping the ball, a signal hand secured to the outer side of the ball and a finger lever secured to its opposite side, diverging guideways for the lever to limit the same in outstanding positions for different signals, and mounting means for fixing the unit in position in a supporting structure and including jamb wings for application to jambs of a sliding window part, said wings being adjustable to windows of different width.

9. A signal unit including a pair of plates having mutual socket parts, a ball mounted in said socket, means for closing the socket on the ball to determine frictional grip thereon, a signal hand extending from one side of the ball and at the outer side of the plates, a manual lever connected to the inner side of the ball, cam guides controlling the lever and leading to a series of effective selective signal positions, and adjustable jamb means on the plates for securing the unit in mounted position.

10. A signal structure having a pair of plates provided with mutual socket parts, a ball mounted in said parts and means for regulating holding friction of the ball, a signal hand extending outward from the ball and an inwardly extending finger lever on the ball, pull means connected to the lever to retract the signal hand, cam guides controlling the lever and leading to various effective, selective signal places, and end wings adjustably mounted on the plates for securing the structure on a supporting means and means for jambing the wings into holding position.

S. A. GAEDE.